United States Patent [19]
Michishita et al.

[11] 3,992,673
[45] Nov. 16, 1976

[54] SYSTEM FOR DEMODULATING A DIGITAL MODULATED WAVE

[75] Inventors: Hisakichi Michishita, Machida; Hidetaka Yanagidaira, Ohmoya; Katsuhiko Furuya, Tokyo, all of Japan

[73] Assignee: Kokusai Denshin Denwa Kabushiki Kaisha, Japan

[22] Filed: June 5, 1974

[21] Appl. No.: 476,686

[30] Foreign Application Priority Data
June 11, 1973 Japan.................................. 48-64691

[52] U.S. Cl.................................. 329/104; 178/88; 325/320; 328/119
[51] Int. Cl.² .......................................... H03K 9/04
[58] Field of Search ............ 329/104; 328/119, 118; 325/320; 178/88

[56] References Cited
UNITED STATES PATENTS

| | | |
|---|---|---|
| 3,571,712 | 3/1971 | Hellworth et al.................... 329/104 |
| 3,588,718 | 6/1971 | Oiso................................... 329/104 |
| 3,729,684 | 4/1973 | Shuda.............................. 325/320 X |
| 3,739,277 | 6/1973 | Schneider et al............... 325/320 X |
| 3,739,289 | 6/1973 | Bochmann...................... 325/320 X |
| 3,846,708 | 11/1974 | Franco................................ 329/104 |

Primary Examiner—John Kominski
Attorney, Agent, or Firm—Robert E. Burns; Emmanuel J. Lobato; Bruce L. Adams

[57] ABSTRACT

A system for demodulating digital phase-modulated wave having signal elements of constant length by detecting in a detector the signal wave elements during every period of substantially the constant length, in which a combining circuit is further provided for estimating digital information content of the signal wave elements by the use of a combined output of detected results obtained by sequentially detecting, the information content of successive two of each signal wave element of the detected output of the detector, so that a demodulated output is obtained by selecting one of the outputs of the detector or the combining circuit.

5 Claims, 11 Drawing Figures

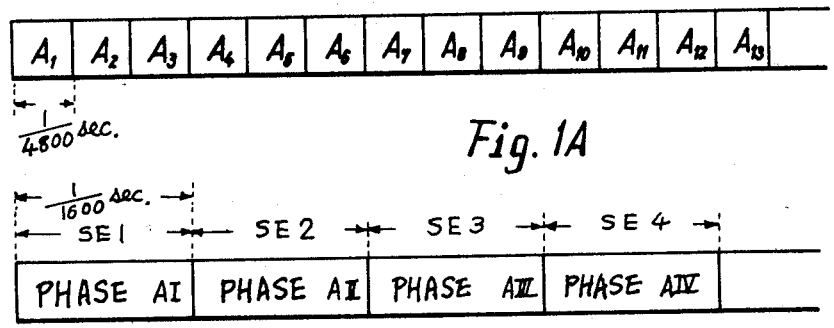
Fig. 1A
Fig. 1B
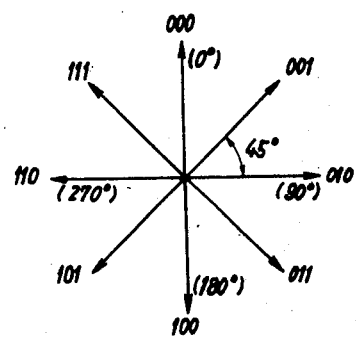
Fig. 1C
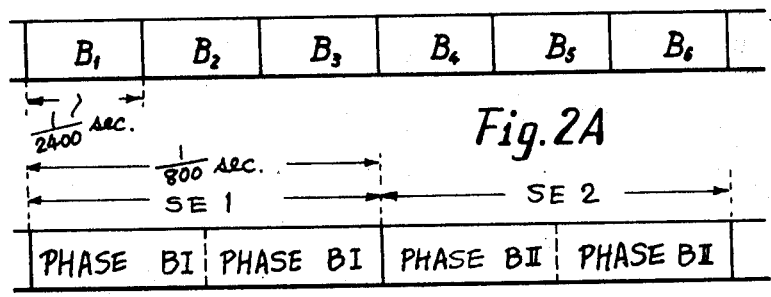
Fig. 2A
Fig. 2B

SYSTEM FOR DEMODULATING A DIGITAL MODULATED WAVE

This invention relates to a system for demodulating a digital modulated wave for use in a fallback system for reducing and restoring data transmission.

In the transmission of digital information, when the quality of a transmitted signal is lowered by deterioration of the quality of the transmission line or the like, good quality of the transmitted signal can be maintained by decreasing the transmission speed. However, in such a case of maintaining the good quality of the transmitted signal by lowering the transmission speed, it is necessary to prepare a modem suitable for the transmission speed. Further, in case of reducing the transmission speed by altering the modulation speed, it is sufficient only to exchange a transmitting filter and a receiving filter by each other. However, this involves the use of a plurality of filters, which leads to a further increase in the space occupied by the filters in the modem. Moreover, in case of a phase modulation system, there are some occasions where a change in the number of quantum phase positions does not provide a desired transmission speed. Let's take as an example the 4800 - BPS (bits per second) transmission utilizing a telephone circuit of an 8-phase phase-modulation system with a modulation speed of 1600 Bauds, which is recommended by CCITT (International Telegraph and Telephone Consultative Committee). In case of reducing the transmission speed by half, i.e. 2400 BPS in the above example, if the number of quantum phase positions is altered to four which satisfies $2^n$ ($n$ being a natural number), the modulation speed is 1600 Bauds and two bits are transmitted in 1/1600 second. Accordingly, the transmission speed becomes $1600 \times 2 = 3200$ (BPS), and the number of quantum phase positions is thus reduced by half, but the transmission speed is not reduced by half.

An object of this invention is to provide a system for demodulating a digital modulated-wave, which is adapted to have a function of demodulating a digital modulated wave of different transmission speed only by the addition of a simple auxiliary device to the same demodulating device.

The system of this invention enables, in combination with the transmitting side, transmission of signals of high quality by changing the transmission speed without changing the modulation speed and the modulation system.

The principle, construction and operations of this invention will be clearly understood from the following detailed description taken in conjunction with the accompanying drawings, in which:

FIGS. 1A, 1B, 2A and 2B are signal configuration diagrams explanatory of digital modulated waves handled in the system of this invention;

FIG. 1C is a vector diagram illustrated in connection with the signal configuration shown in FIG. 1B;

Figure 3:
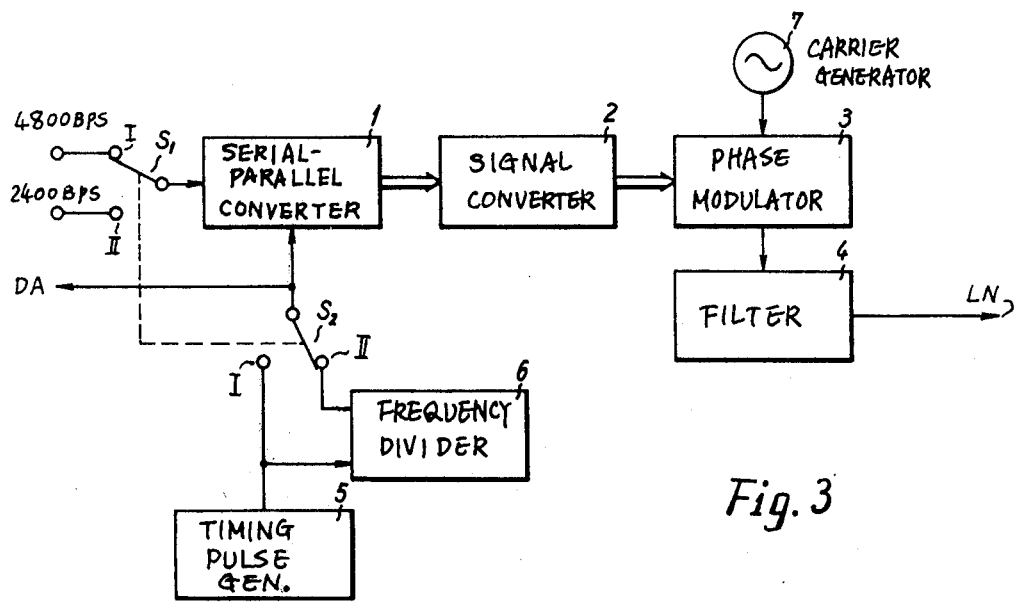
FIG. 3 is a block diagram explanatory of an example of a system employed for forming a digital modulated wave to be demodulated by the system of this invention.

To facilitate a better understanding of the invention, a description will be given first with regard to a case where, in an 8-phase phase modulation-and-demodulation system having a modulation speed of 1600 Bauds and a transmission speed of 4800 BPS, the transmission speed is reduced by half, i.e. 2400 BPS, while a number of quantum phase positions and the modulation speed are held unchanged.

FIG. 1 shows diagrams for explaining a case of the digital transmitting speed of 4800 BPS. FIG. 1A shows a train of data signals of 4800 BPS, each of the signal elements $A_1$, $A_2$, $A_3$, ... being 1-bit data signals of either "0" or "1". These data signals having an element length of 1/4800 second are divided into blocks each including three bits (each block being referred to as a tri-bit signal). Any one of eight quantum phase positions of a carrier wave is selected in response to the tri-bit signal and this selected phase position is maintained for a period of time corresponding to the 3-bit data signal length, that is, for 1/1600 second. Each section thus modulated is called as a signal wave element. FIG. 1B shows the state of phase positions of the carrier subjected to such a phase modulation, from which it appears that the carrier has one of eight quantum phase positions during each signal wave element of 1/1600 second as indicated by phases AI, AII, .... FIG. 1C illustrates one example of coding for transmitting the tri-bit signal by the 8-phase modulation, in which any one of eight quantum phase positions each equal to an integral multiple of 45° is determined in accordance with the eight signal states respectively represented by the eight tri-bit signals. For example, if a tri-bit signal ($A_1$, $A_2$, $A_3$) assumes a combination of states "010" in FIG. 1A, the phase AI of the signal wave element SE 1 in FIG. 1B is 90°.

FIG. 2 shows diagrams for explaining a case where the transmission speed in FIG. 1 is reduced by half. FIG. 2A illustrates a train of data signals having a transmission speed of 2400 BPS, i.e. ½ of that employed in FIG. 1A, each of signal elements $B_1$, $B_2$, $B_3$, ... is a one-bit data signal of "0" or "1" and has a signal element length of 1/2400 second, which is twice as long as that 1/4800 second in FIG. 1. Further, the digital information having the element length of 1/2400 second is divided into blocks ($B_1$, $B_2$, $B_3$; $B_4$, $B_5$, $B_6$) each including three bits and, any one of eight quantum phase positions of a carrier is selected by the tri-bit signal of each block as is the case of FIG. 1. FIG. 2B shows the states of the phase of the carrier. In this case, since each element length is twice that in FIG. 1, the length of one block is also 1/800 second, that is, twice that in FIG. 1. Consequently, the length of one signal wave element is also 1/800 second which is twice that in the case of FIG. 1.

In this invention, the respective signal wave elements SEI, SEII ... are each further divided into two parts of 1/600 second, as shown in FIG. 2B and both of these parts of the signal wave elements of 1/1600 second carry the same digital information. The divided parts will be described below as successive signal wave elements. Namely, the same digital information is successively transmitted twice, by which the transmission speed of 2400 BPS is apparently achieved with the transmission speed of 4800 BPS. In the demodulation, either one of the same digital information transmitted with each of the two successive signal wave elements (BI, BI; BII, BII) divided as described above is selected, or the sum of the both is obtained in the base band region, so that the signal of 2400 BPS can be reproduced. In the former case, that is, in the case of using only one signal in the demodulation, noise components are not averaged but, since the same digital information is transmitted with each of the successive signal wave elements, the amount of inter-element interference can be decreased. In the latter case, that is, in the case of obtaining the sum, a circuit for storing the phase position of the preceding signal element is required but the noise components are averaged and the signal component is doubled, so that this method has an advantage that, in connection with electric power, a S/N ratio increases by 3 db.

FIG. 3 is a block diagram illustrating one example of the construction of a modulating section or modulator for use in the practice of the system of this invention, in which wide connection lines indicate parallel signal paths. A reference character $S_1$ indicates a switch, which is connected to a contact I or II depending upon whether the communication speed of an input signal is 4800 BPS or 2400 BPS, and through which a data signal from a data source DA (not shown) is applied to an S-P converter 1 for converting a serial signal into parallel signals. A reference character $S_2$ designates a switch for timing signal selection, which is ganged with the switch $S_1$ and connected with a contact I or II depending upon whether the communication speed is 4800 BPS or 2400 BPS, thus selecting a timing signal corresponding to the communication speed being used. The contact I of the switch $S_2$ is directly supplied with output pulses of a timing pulse generator 5, and the contact II of the switch $S_2$ is supplied with timing pulses obtained by frequency dividing the output pulses of the pulse generator 5 by a frequency divider 6 into a pulse train having one-half the pulse repetition rate of the output of pulse generator 5, and these timing pulses are supplied to required circuits. The timing pulses of 4800 BPS or 2400 BPS selected by the switch $S_2$ are applied to the data source DA, so that the data signal is supplied to the contact I or II of the switch $S_1$ in synchronism with the supplied timing pulses. Thus, the serial input data signal selected by the switch $S_1$ is applied to the S-P converter circuit 1, which is actuated by the timing pulses selected by the switch $S_2$, and thereby converted into 3-bit parallel signals, which are applied to a signal converter 2. This signal converter 2 is a circuit, which converts the tri-bit signal applied thereto from the above-mentioned S-P converter 1 into phase information indicative of a phase position corresponding to the tri-bit signal. For example, if the 3-bit parallel signals assume states "010" as shown in FIG. 1C, the output of the signal converter 2 is a code unit indicative of the phase of 90°. This code unit indicating a corresponding phase position is applied to a phase modulator 3, which is supplied with a carrier from a carrier generator 7. The carrier from the carrier generator 7 is modulated by the output of the aforementioned signal converter 2 to provide an 8-phase phase-modulated wave, which is sent to a transmission line LN through a filter 4.

Figure 4:
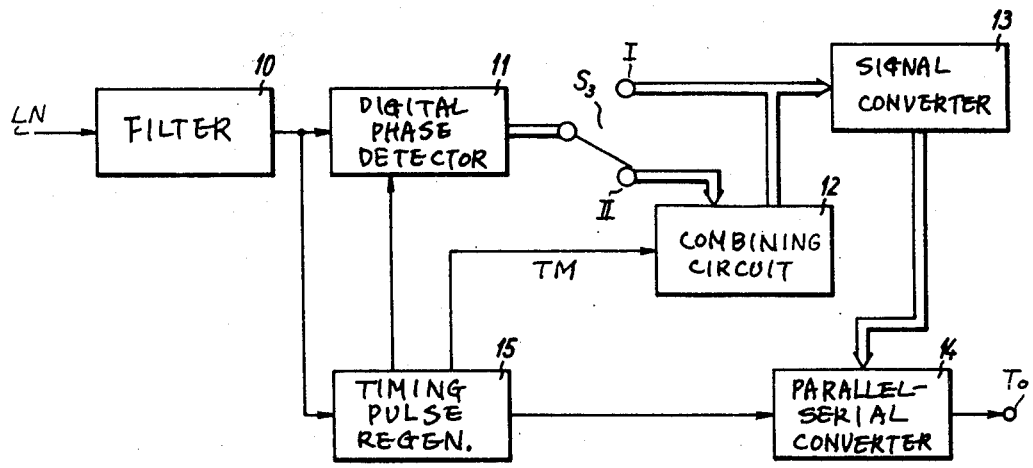
FIG. 4 is a block diagram illustrating an example of this invention.

FIG. 4 is a block diagram illustrating one example of the demodulation system or demodulator of this invention, in which wide connection lines indicate parallel signal paths. An input signal from the transmission line LN passes through a filter 10 and is divided into two parts: the one is applied to a digital phase detector 11, and the other is applied to a timing signal regenerator 15. The digital phase detector or detecting means 11 detects the input signal in accordance with the timing pulses supplied from the timing signal regenerator 15 to obtain phase information, which is directly applied through a switch $S_3$ to a signal converter 13 or applied to the signal converter circuit 13 through a combining circuit or means 12. Namely, the switch $S_3$ has the same function as the switch $S_1$ described previously with regard to FIG. 3. If the signal of 4800 BPS is transmitted, the switch $S_3$ is connected to its contact I to supply, to the signal converter 13, the phase information from the phase detector 11, that is, the code units each indicative of one of the eight quantum phase positions. On the other hand, if the signal of 2400 BPS is transmitted, the switch $S_3$ is connected to its contact II to apply the output of the phase detector 11 to the combine circuit 12, which combines the phases of two successive signal wave elements of 1/1600 second or selects either one of the phases in synchronism with the timing pulses TM supplied from the timing pulse generator 15. The output of the circuit 12 is applied to the signal converter circuit 13. This signal converter circuit 13 has a function opposite to that of the signal converter 2 described previously in connection with FIG. 3, by which phase information indicative of the phase of the signal received from the transmission line LN is converted into a corresponding tri-bit signal. For example, if it is assumed that a signal having a quantum phase position of 90° as shown in FIG. 1C is received, the output of the signal converter 13 is assumes the state "010". This converted output of parallel signals is further converted by a parallel-serial converter 14 into a serial signal to provide a demodulated data signal. The parallel-serial converter may be any of the well-known types such as a shift register having parallel inputs and a serial output. These are commercially available from Texas Instruments, Inc., such as their SN7494 and SN7495A units.

Figure 5:
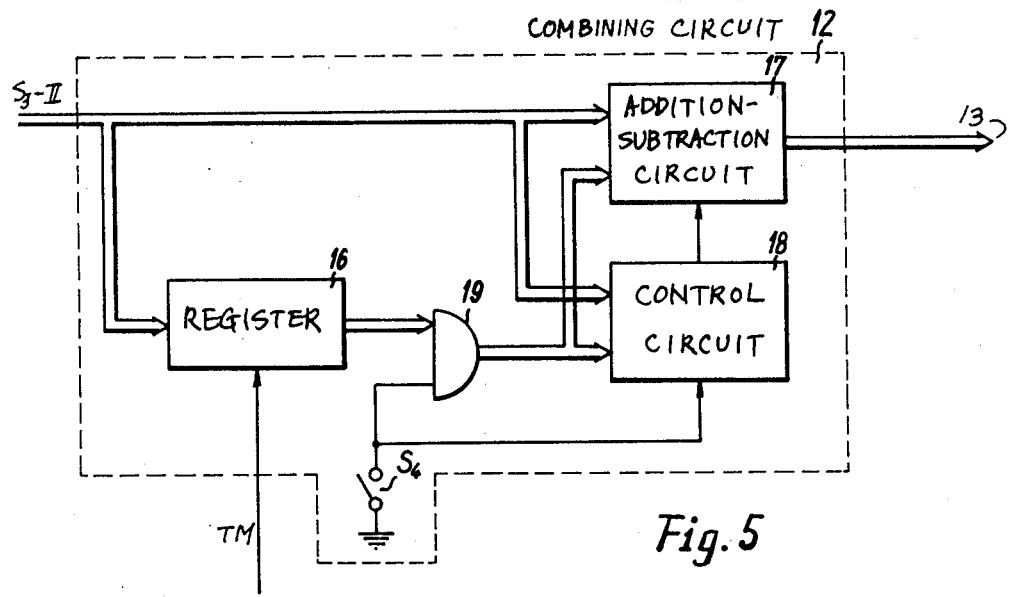
FIGS. 5 and 6 are block diagrams illustrating examples of a combine circuit employed in the example shown in FIG. 4.
Figure 7A:
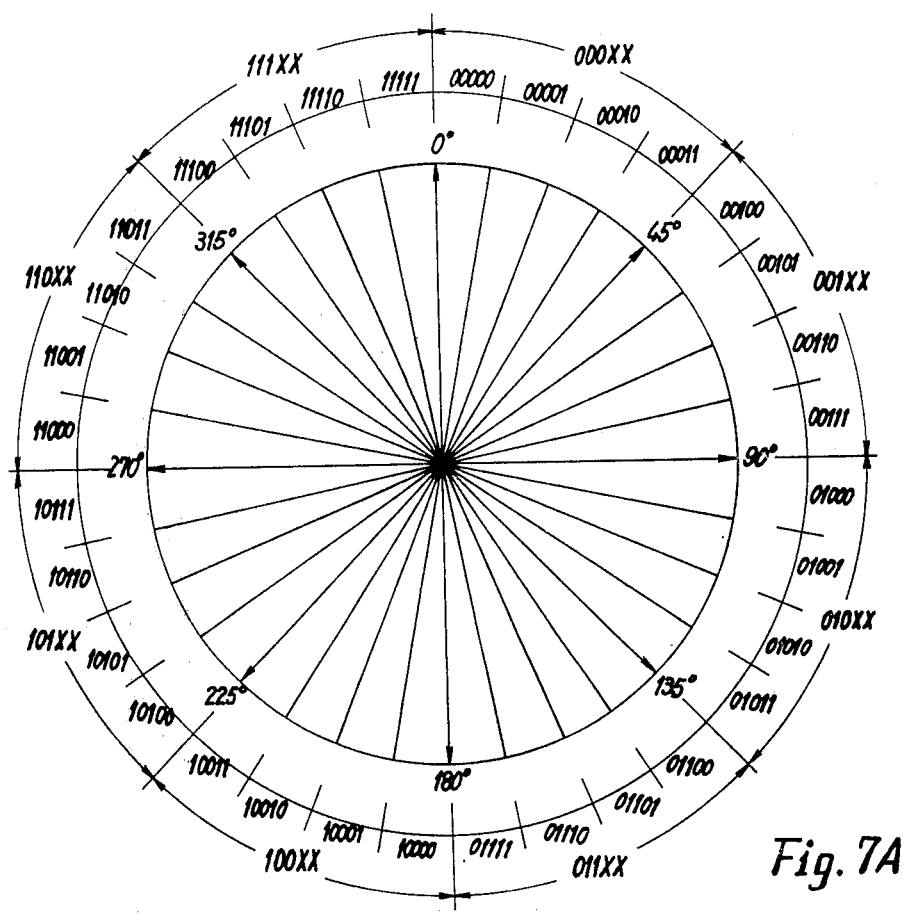
FIGS. 7A and 7B are vector patterns explanatory of the operations of the example shown in FIG. 6.
Figure 7B:
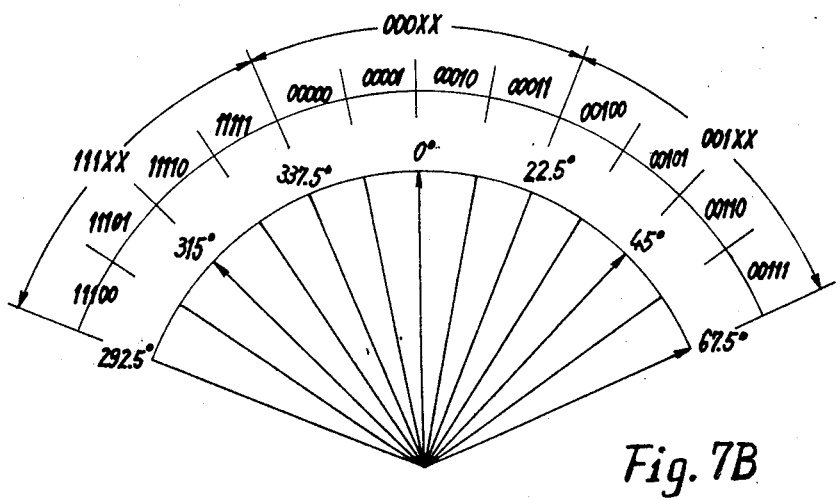

Next, a specific embodiment of the combining circuit 12 will be described. FIG. 5 is a block diagram showing one example of the construction of the combine circuit 12 shown in FIG. 4. When the transmission speed is 2400 BPS, quantum phase information is applied to the contact terminal II of the switch $S_3$ from the phase detector 11 in FIG. 4. If it is assumed that this phase information is represented, for example, by five bits, three higher significant bits indicate any one of eight quantum phases and two lower significant bits indicate a phase deviation due to noise. Namely, as shown in FIG. 7A, quantization of 0° to 360° with five bits corresponds to division of 360° into $2^5 = 32$ regions and allocation of 5-bit binary numbers to these regions, respectively. Each of these regions is $360°/32 = 11.25°$ in terms of angle. Special code units are allocated to the regions respectively, for example, in such a manner that code units "00000", "00001", "00010", . . . are allocated to the regions 0° to 11.25°, 11.25° to 22.50°, 22.50° to 33.75°, . . . respectively. As will be apparent from FIG. 7A, the three higher significant bits remain unchanged in the region of 45°, and the two lower significant bits indicated by symbols XX in FIG. 7A differ every four regions each having an angular width of 11.25°. These two bits designate one of the four regions of 45° indicated by the three higher significant bits. By the way, in FIG. 7A, the binary code unit "00000" corresponds to the region starting from 0°, but if 0°, 45°, 90°, . . . are used as boundaries for allocatting the code units, a practical 8-phase phase-modulated wave transmits 0°, 45°, 90°, . . . as quantum phase information, so that they fluctuate positive or negative about each quantum phase position due to noise to cause a change in the code unit before and after the aforementioned boundaries. This is unadvantageous. To avoid this, 0° is turned in a counterclockwise direction by 22.5° so that these boundaries may be the center of the regions indicated by the three higher significant bits of the code unit and the region 337.5° to 22.5° is caused to correspond to the code unit "00000" as shown in FIG. 7B illustrating only the vicinity of 0°. Thus, even if the phase of a carrier having a phase of 0° fluctuates due to noise, the three higher significant bits represent the transmitted phase information while two lower significant bits indicated by symbols XX in FIGS. 7A and 7B represent the phase fluctuation due to noise. Upon application of such phase information to the combining circuit 12, it is branched to a register 16, an addition-subtraction circuit 17 and a control circuit 18. The signal applied to the register 16 is delayed by the register 16 by one signal wave element of 1/1600 second in synchronism with the timing pulses TM and applied to the addition-subtraction circuit 17 and the control circuit 18 through an AND gate 19. The addition-subtraction circuit 17 is a circuit for calculating the mean value of the input from the terminal II of the switch $S_3$ and the output of the register 16, and a control circuit 18 is a circuit for controlling the addition and subtraction operation of the circuit 17. A switch $S_4$ is a switch for selecting either one of two signals, each including the same information having a length of 1/1600 second. By turning-on the switch $S_4$, one of the inputs to the AND gate 19 is held at zero potential and, as a result of this, the output of the AND gate 19 is held at zero potential, by which the contents of the signal delayed by the register 16 are forcibly reduced to zero and unconditionally added with the other signal including the same information which is non-delayed. At this time, however, the aforementioned operation for the division by two must not be performed. Thus, it is possible to select only one preceding signal part of the two successive signal elements indicative of the information of the same content.

Now, a description will be further given in connection with the addition and subtraction operation by the addition-subtraction circuit 17 and the control circuit 18 described previously. Let's assume now that the control circuit 18 is a circuit which causes the circuit 17 to perform the addition operation in the case of the input signal being ordinary phase information and causes the circuit 17 to perform the subtraction operation in the case of the input signal being special phase information, and that the phase information is quantized with the code allignment shown in FIG. 7B. If a carrier having a phase of 0° is twice transmitted continuously, and if code units "00000" and "00011" are obtained as inputs to the addition-subtraction circuit 17, 00000 + 00011 = 00011 is obtained as the sum of them. In this case, no carry exists but if zero is placed at the digit where carry exists, six bits "000011" are obtained. In the operation of binary numbers, division by "2" corresponds to shifting of all bits to the right hand by one bit. consequently, if the code unit "000011" is shifted to the right hand by one bit and if the figure below the decimal point is omitted, a code unit "00001" is obtained and this value is indicative of the mean value of code units "00000" and "00011".

The three higher significant bits of this mean value naturally carries transmitted information. In the case of the foregoing example, the addition-subtraction circuit 17 receives inputs having the three higher significant bits being the same as "000". However, if noise is high so that the inuts to the circuit 17 are "00000" and "00101", "00010" is obtained as the mean value by a similar manner. Accordingly, although one of the inputs is "00101" and erroneous, noise components are averaged by achieving the operation for the mean value and no error is produced in the three higher significant bits carrying information.

In the foregoing example, the addition-subtraction circuit 17 is actuated as an adder to obtain the mean value but, in a special case, that is, in the case where the one of the inputs to the circuit 17 is in the region of "000XX" and the other in the region of "111XX" in FIG. 7B, such an operation for obtaining the mean value as described above causes an error. For example, if the one input is "00000" and the other is "11111", the mean value obtainable with addition is "01111" and indicates an angle 146.25° to 157.5° in the code allignment of FIG. 7B. Although an angle in the vicinity of 337.5° is to be obtained as the mean value, an error of about 180° is produced. In such a case, by comparing the two inputs with the control circuit 18, it is decided that the one of the inputs to the circuit 17 lies in the lowest region of "000XX" and that the other lies in the highest region of "111XX", and by the decided output, the addition-subtraction circuit 17 is actuated as a subtractor. Namely, for example, the code unit in the region of "111XX" is converted into a complement and addition is effected. This corresponds to the fact that, where the inputs to the circuit 17 are 5° and 350°, respectively, in the decimal notation, 350° is added as a complement −10 with respect to 360° to effect an operation 5 + (−10) = 15. Thereafter, the value indicated by the complement is returned to a true number, and the aforesaid operation for obtaining the mean value by division by 2 is performed.

Figure 6:
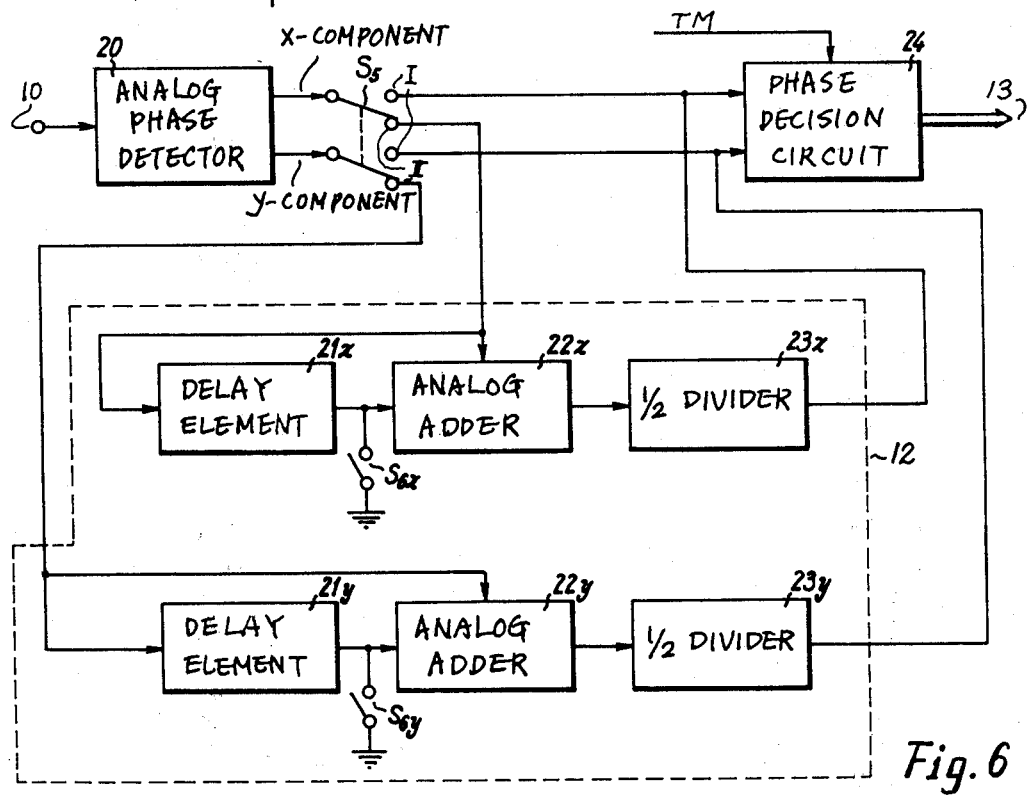

FIG. 6 is a block diagram illustrating another example of the construction of the combining circuit 12. The combine circuit 12 shown in FIG. 5 has the function of combining and selecting the digital output from the digital phase detector but the example of FIG. 6 shows the case of the circuit having a function of combine and selecting an analog output. In this case, it is necessary to replace the digital phase detector 11 in FIG. 4 by an along phase detector 20 and to provide a phase decision circuit 24 before the signal converter circuit 13. The output of the filter 10 in FIG. 4 is applied as an input signal to the analog phase detector 20 to derive therefrom an analog voltage output indicative of the x component of the phase and an analog voltage indicative of the y component. When the transmission speed is 4800 BPS, these signals are connected by a switch $S_5$ to a contact I so that the output of the analog phase detector 20 is applied, as it is, to the phase decision circuit 24. When the transmission speed is 2400 BPS, the signals are connected to a contact II, so that the output of the analog phase detector 20 is applied to the phase decision circuit 24 through the combining circuit 12. The phase decision circuit 24 is known and is described in the book DATA TRANSMISSION by Bennett & Davey, Mc-Graw Hill (1965) at pages 204–208. An application of phase decision circuits in digital data transmission is given in the C.C.I.T.T. paper COM Sp.A-No. 65-E (September 1970) at page 7.

A description will hereinbelow be made of the operation of the combining circuit 12 shown in FIG. 6. Since the circuits for x and y components are identical with each other, only the circuit for the x component will be described. When the contact II is selected by the switch $S_5$, the output of the analog phase detector 20 is applied to the combining circuit 12. This signal is branched into two parts: the one is applied to an analog adder 22x and the other is applied to a delay element 21x. The delay element 21x is formed by a delay line, a sample hold circuit or the like and provides a delay of one signal wave element of 1/1600 second. The delayed output of the delay element 21x is applied to the analog adder 22x. The analog adder 21x is a circuit for adding the delayed output of the delay element 21x and the aforementioned non-delayed signal directly fed from the analog phase detector 20 to provide an output of the sum of the both inputs. Then, this output of the sum from the circuit 22x is applied to a ½-divider or attenuator 23x to be reduced to one-half, by which an output of the mean value of the two phase-detected outputs of two successive signal wave elements is obtained. This output is applied to the phase decision circuit 24. On the other hand, an output of the mean value of the y component is obtained by the same manner as that for obtaining the mean value output of the x component described above and applied to the phase deciding circuit 24. The phase decision circuit 24 decides which phase information of the eight phases are indicated by the signals of the x and y components to provide 8-phase phase information synchronized with timing pulses TM. This information is represented with 3-bit code units and these code units are applied to the signal converter 13 and the parallel-serial converter 14 such as shown in FIG. 4, thus obtaining a demodulated output. Switches $S_{6x}$ and $S_{6y}$ are switches for selecting only the preceeding element and, by turning-on the switches $S_{6x}$ and $S_{6y}$, the following element output is forcibly reduced to zero and only the preceding element output is selected. Where the switches $S_{6x}$ and $S_{6y}$ are in their on-state, the operation of the ½ divider is suspended.

For convenience of description, the foregoing description has been given with regard to the case where, in the 8-phase modulation system, the same information is transmitted for two successive signal elements without changing the modulation speed and, in the demodulating system, the transmitted information is combined or selected to reduce the transmission speed of 4800 BPS by half to 2400 BPS. However, the transmission speed is not limited specifically to the above ones 4800 BPS and 2400 BPS and it is easy to change other transmission speed to ½ and the invention is also applicable to the case of changing the transmission speed to $1/n$ ($n$ being a natural number).

Further, this invention is not limited to the 8-phase modulation but may be applied to other multiphase modulation and is basically applied not only to phase modulation but also to other multivalue data transmission system.

With this invention, it is possible to realize an excellant fallback system for data transmission which enables easy conversion of a transmission speed into $1/n$ by a simple device in a data modulation and demodulation system of a certain transmission system and which is excellent in inter-signal elements interference, provides an increase of $10 \log_{10} n$ dB in S/N by supressing noise components in the case of output combining and has a time diversity effect since the same information is present with two successive signal wave elements.

What we claim is:

1. A system for demodulating a digital modulated wave comprised of signal wave elements of substantially uniform duration and each having a substantially constant phase throughout its duration, comprising:
    phase detecting means receptive of said digital modulated wave for detecting the phase of successive portions of each of said signal wave elements and for developing output signals representative of the detected phases of the successive portions of each signal element; and
    combining circuit means receptive of the detecting means output signals for combining the signals representative of the detected phases of the successive portions of each of said signal wave elements thereby to average noise components combined with said digital modulated wave to reduce the effect of the noise on the detected phase of each signal element represented by the combination of the signals representative of the phase of its successive portions.

2. A system for demodulating a digital modulated wave according to claim 1, wherein said phase detecting means develops output signals comprised of binary digital code words representative of the phase of the successive portions of each of said signal wave elements.

3. A system for demodulating a digital modulated wave according to claim 2, wherein said means for averaging comprises:
    a register receptive of the digital code words developed by said detecting means for delaying the code words for a period equal to the duration of the portion of said signal wave elements the information content of which is represented by said digital code words;
    an AND gate having an input receptive of the digital code words developed by said detecting means;
    a switch connected between another input of said AND gate and ground and operable for switching the potential of said another input to zero;
    a control circuit receptive of the output of said detecting means and the output of said AND gate for developing control signals indicative of whether or not the outputs of said detecting means and said AND gate are respectively within the lowest and highest binary numbers represented by the information content of said signal wave elements; and
    an addition-subtraction circuit responsive to said control signals and receptive of the respective outputs of said detecting means and said AND gate for adding or subtracting the received output signals under control of said control signals.

4. A system for demodulating a digital modulated wave according to claim 1; wherein said digital modulated wave is phase-modulated and said signal wave elements each have substantially constant phase throughout; and wherein said detecting means comprises an analog detector for developing analog output signals respectively representative of the X and Y components of the phases of said signal wave elements, and a phase decision circuit receptive of said analog detector output signals for developing output code words representative of the phases of said signal wave elements.

5. A system for demodulating a digital modulated wave according to claim 4, wherein said means for averaging comprises:
- a pair of delay elements each having a delay time equal to a portion of the duration of a signal wave element and each receptive of a respective one of the analog output signals from said analog detector;
- a pair of analog adders each receptive of the output from a respective one of said delay elements and the input of the respective one of said delay elements;
- a pair of attenuators each receptive of the output from a respective one of said analog adders for attenuating the respective analog adder outputs by one half; and
- a pair of switches each connected between ground and the output of a respective one of said delay elements and each operable to ground the output of the respective delay element.

* * * * *